Aug. 8, 1967          M. B. EATON          3,334,707
DISC BRAKE FOR RAIL VEHICLES
Filed Aug. 16, 1965          7 Sheets-Sheet 7
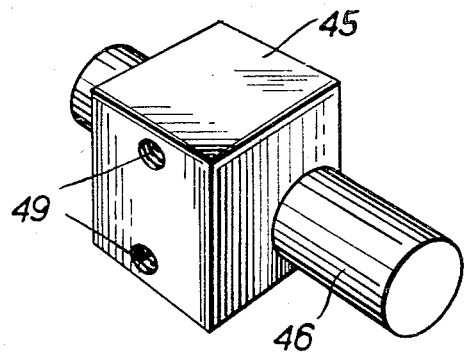
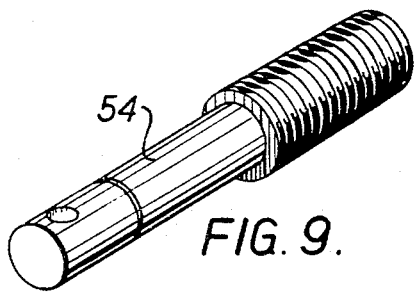 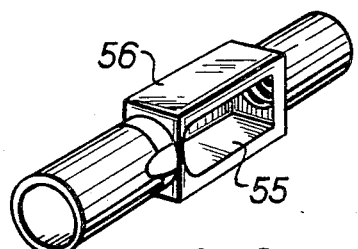
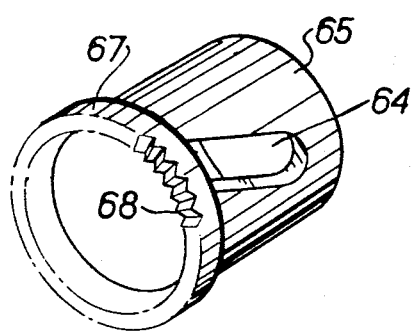 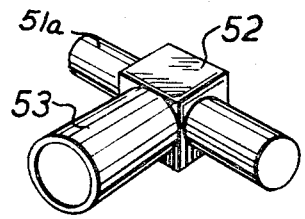

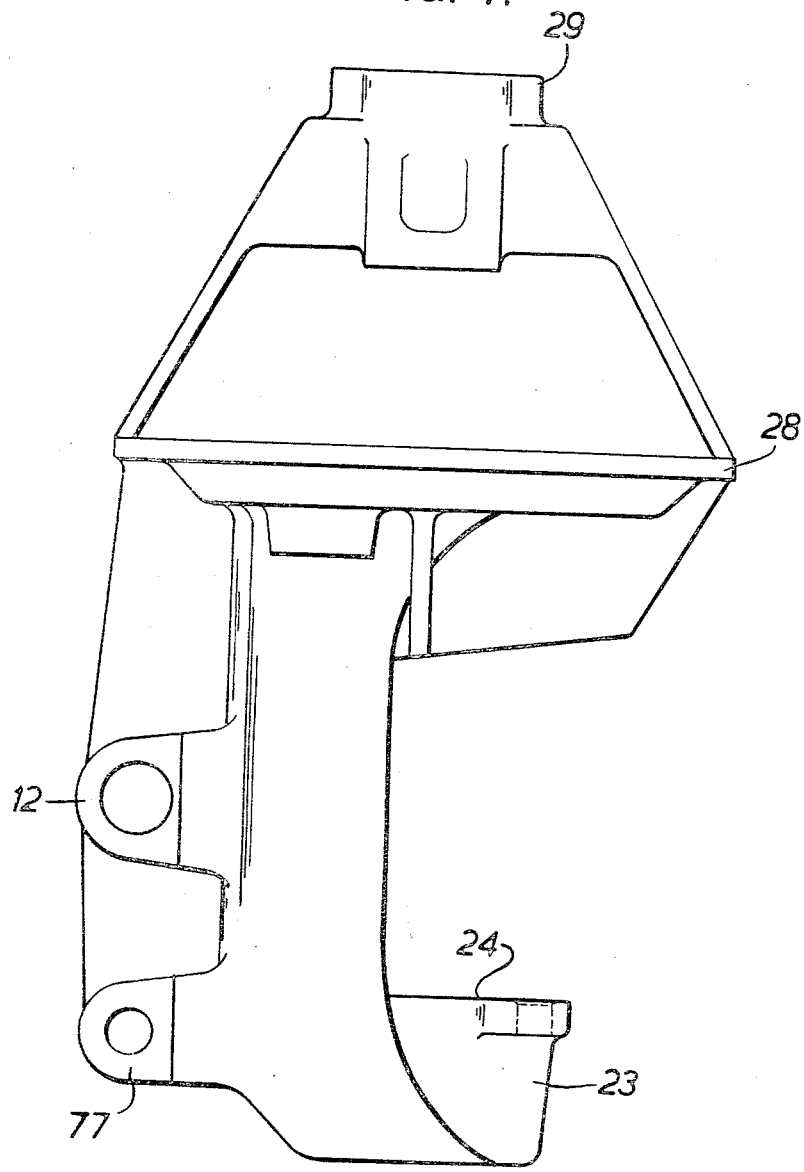

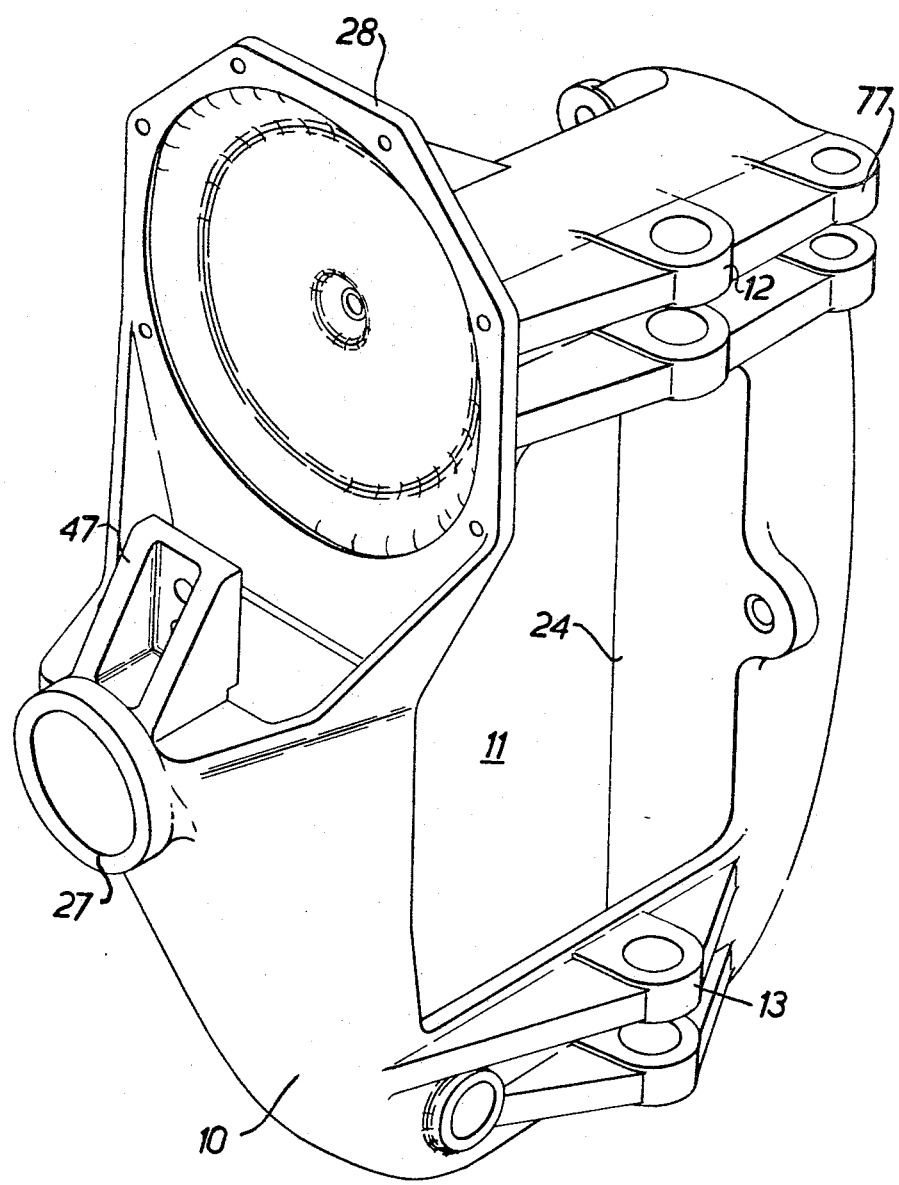

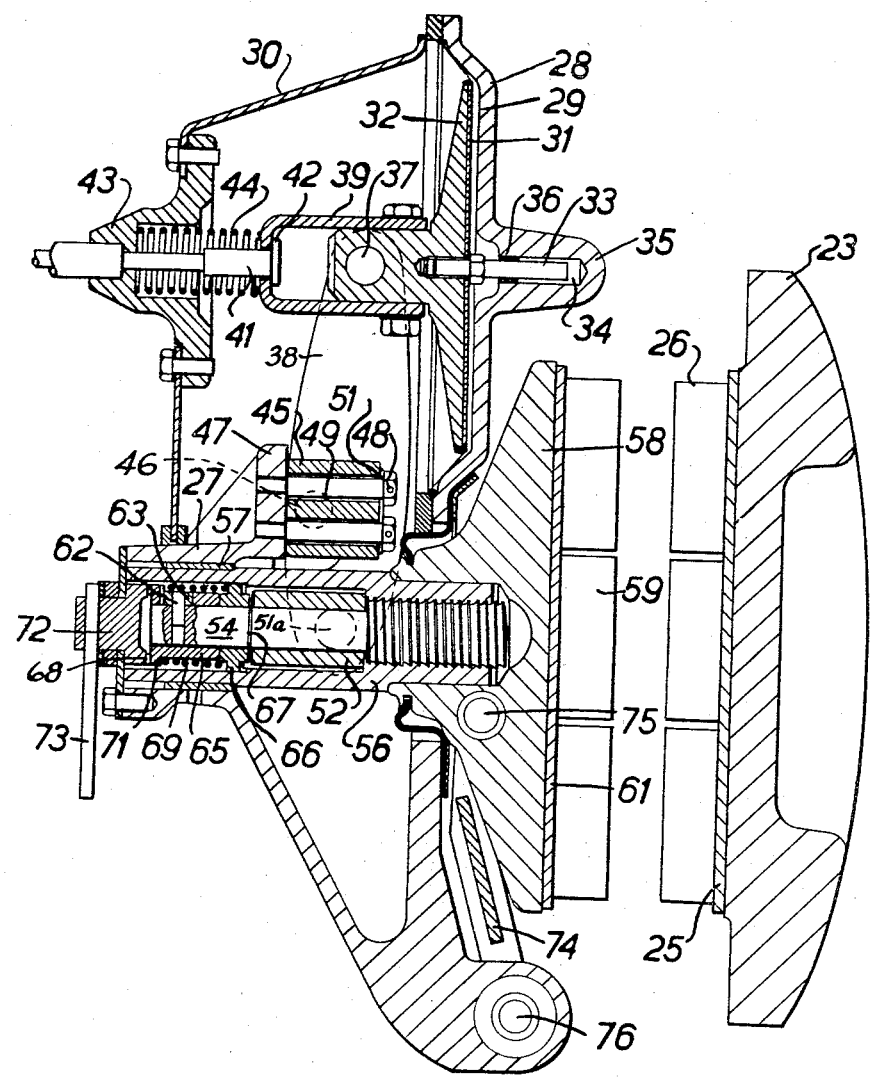

United States Patent Office 3,334,707
Patented Aug. 8, 1967

3,334,707
DISC BRAKE FOR RAIL VEHICLES
Maurice B. Eaton, Kings Norton, Birmingham, England, assignor to Girling Ltd., Tyseley, England, a British company
Filed Aug. 16, 1965, Ser. No. 479,940
Claims priority, application Great Britain, Aug. 15, 1964, 33,407/64
7 Claims. (Cl. 188—59)

ABSTRACT OF THE DISCLOSURE

A disc brake, particularly for railway vehicles, comprises a body having an opening which receives a portion of the periphery of a brake disc, and a pair of brake pads mounted one on either side of the opening, one of the pads being fast with the body, while the other one is movable under the action of a power actuator working on the pad through lever means. To facilitate the movements of the body relative to the disc which take place upon brake application, the body is mounted by means of a swing arm hingedly connected on the one hand to the body, and on the other hand to a mounting bracket which can be secured to the chassis of the rail vehicle. The brake assembly thus forms a self-contained unit which can be readily mounted upon a rail vehicle while catering for relative movements which occur in operation.

---

This invention relates to improvements in disc brakes particularly, but not exclusively, for rail vehicles.

According to our invention a disc brake for vehicles comprises a self-contained unit adapted to be mounted on a vehicle in proximity to a disc rotatable with a wheel or axle and incorporating a body mounted for angular movement about an axis substantially at right angles to that of the disc and having an opening adapted to receive a portion of the periphery of the disc, friction pads or shoes located in the body on opposite sides of the opening for engagement with opposite faces of the disc, and actuating means offset from one of the the friction pads or shoes on which it acts through a lever or levers for directly applying that friction pad or shoe to the disc, the other pad or shoe being applied to the opposite face of the disc by the reaction on the body.

The body is preferably hingedly connected to a swing arm which is itself hingedly connected to a mounting plate or bracket adapted to be secured to the frame of a vehicle or of a bogie so that the body is free to swing in a direction substantially parallel to the axis of the disc to accommodate axial displacement of the disc, and the swing arm is of such a form that it can twist to a limited extent to allow the friction pads to align themselves accurately with the braking surfaces on the disc when the disc undergoes angular deflection.

The term "disc" is intended to include not only a flat disc or ring mounted on an axle or secured to a wheel but also, in the case of a rail vehicle, a wheel having on opposite sides flat annular braking surfaces for engagement by the friction pads or shoes.

There may be a single actuating means for the directly actuated friction pad or shoe or there may be two actuating means, one power means and one manually operated means. The actuating means preferably applies the directly actuated friction pad or shoe through a member or assembly of members of which the effective length is adjusted automatically to compensate for wear of the friction surfaces. Where there are two actuating means they may apply the directly actuated pad through the same member or members.

Figure 1:
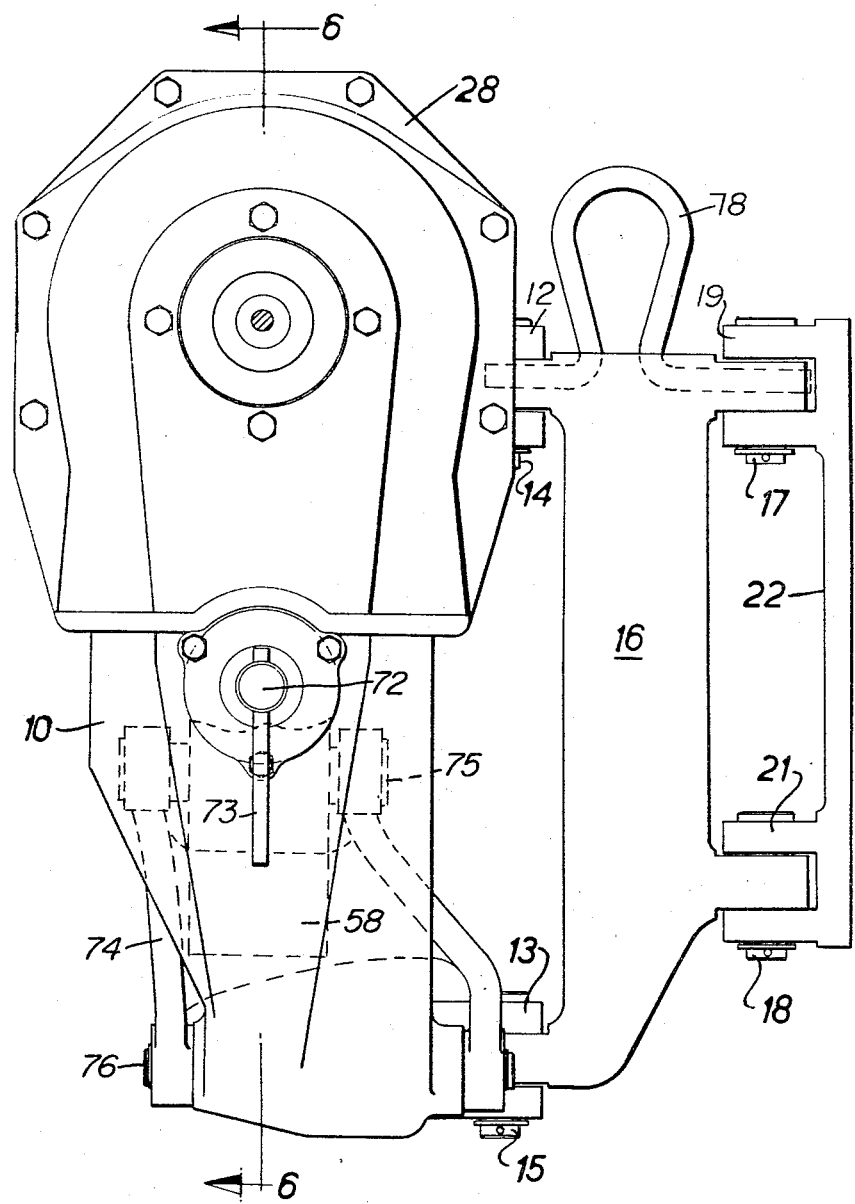
Figure 2:
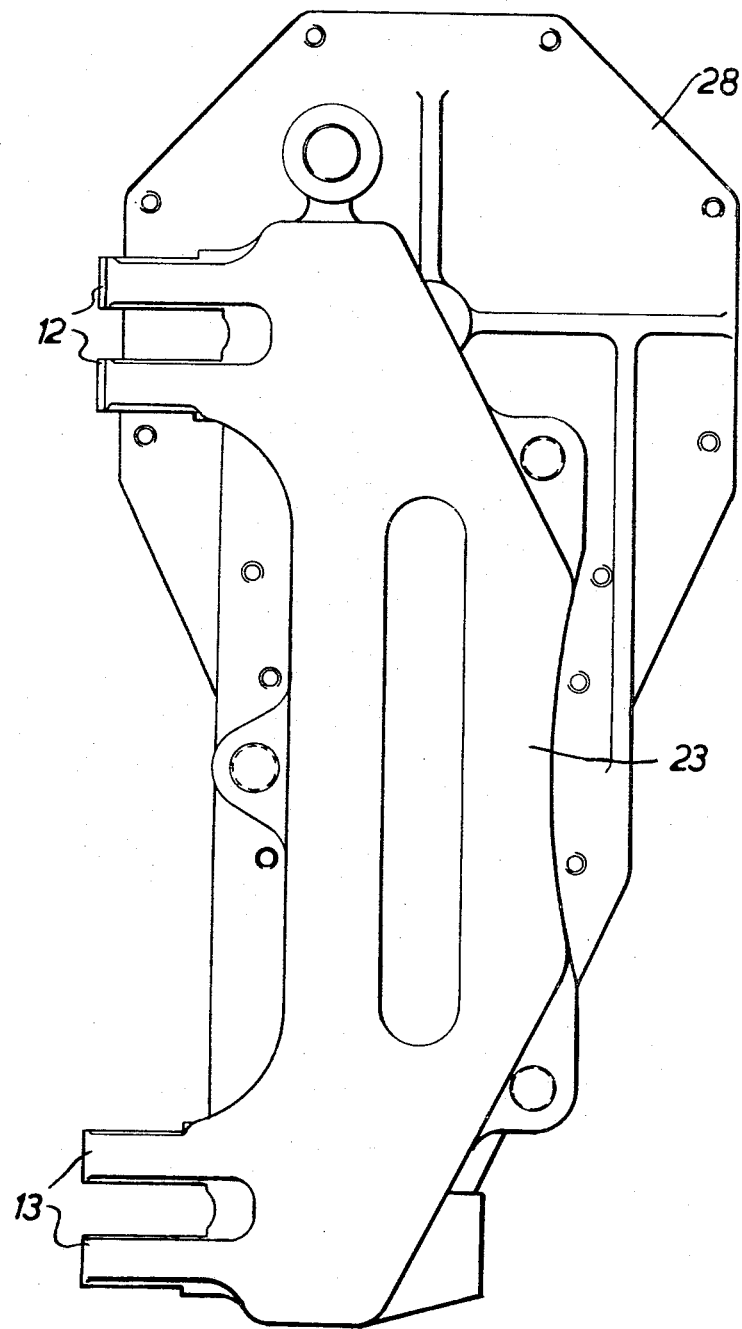
Figure 3:
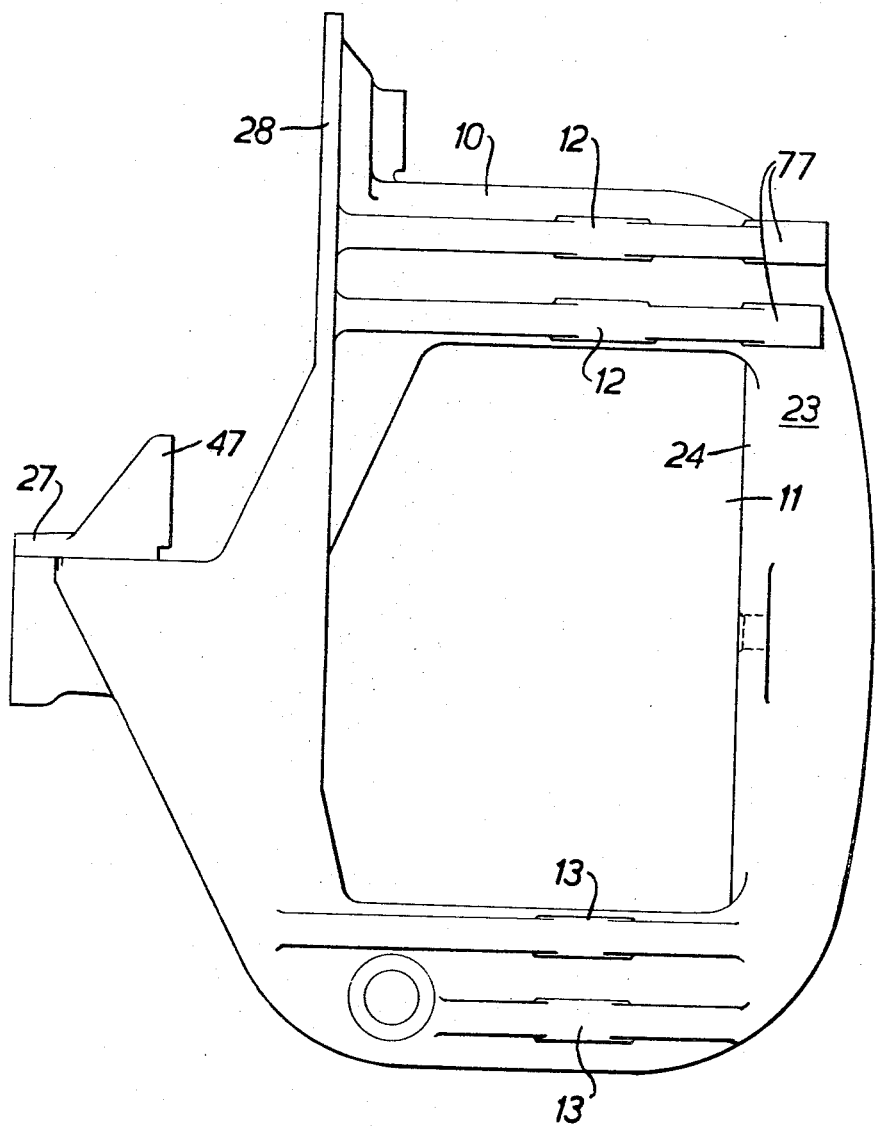

One form of brake in accordance with our invention for use with a disc mounted in an axle of a rail vehicle is illustrated by way of example in the accompanying drawings in which:

FIGURE 1 is an end elevation of the brake showing the body, mounting bracket, and swing arm;
FIGURE 2 is an elevation of the body alone from the other end;
FIGURE 3 is a side elevation of the body alone;
FIGURE 4 is a plan of the body;
FIGURE 5 is a perspective view of the body on a smaller scale;
FIGURE 6 is a longitudinal vertical section of the brake assembly;
FIGURE 7 is a perspective view of the trunnion pivot mounting for the actuating levers;
FIGURE 8 is a perspective view of the trunnion through which the levers act on the directly actuated friction pad or shoe; and
FIGURES 9, 10 and 11 are perspective views of component parts of the automatic adjusting mechanism.

The body 10 of the brake assembly of which the form will be readily appreciated from FIGURES 1 to 5 is a steel casting having an opening 11 adapted to receive a portion of the periphery of a disc (not shown) mounted on and rotating with the axle of a rail vehicle.

The body is provided at one end with circumferentially spaced pairs of lugs 12, 13 to receive pivot pins 14, 15 by which the body is hingedly connected to a swing arm 16 which is itself hingedly connected by further pins 17, 18 to lug 19, 21 on a mounting plate or bracket 22 adapted to be secured to a convenient part of the frame of the vehicle or of a bogie in which the axle is mounted.

The body is thus free to move bodily in a direction parallel to the axis of the disc with any axial movement of the disc. The upper and lower ends of the arm 16 are rigid while the intermediate part is in the form of a flat plate so that the arm can twist to accommodate angular deflection of the disc.

On the inboard side of the disc the body incorporates a rigid beam portion 23 presenting on its inner face a flat surface 24 parallel to the plane of the disc. A backing plate 25 is detachably secured in any convenient manner to the surface 24 and has bonded to it a block or blocks 26 of friction material for engagement with the inboard face of the disc.

On the outboard side of the disc the body incorporates a hollow boss 27 which is of substantial length in an axial direction and is in alignment with the middle of the length of the opening 11 and a part 28 offset circumferentially from the boss 27 and forming one side of a diaphragm chamber 29 of a fluid pressure actuator, the chamber being completed by a domed cover 30. A diaphragm 31 located in the chamber is backed by a piston 32 having an axial stem 33 guided in a blind bore 34 in a boss 35 on the part 28. The stem is carried through a compressible bush 36 at the entrance to the bore, and the diameter of the bore is substantially greater than that of the stem to permit a certain amount of canting or angular movement of the diaphragm and piston.

The piston is pivotally connected by a pin passing through a transverse bore 37 to the upper ends of a pair of parallel levers 38 extending circumferentially towards the hollow boss 27. An axially extending U-shaped shackle 39 is secured to the piston, and a rod 41 adapted to be connected by a rod or cable to a hand-lever for actuating the levers manually is coupled to the shackle by a head 42 on the inner end of the rod. The rod 41 is guided in a bore in a boss 43 secured to the cover 30, and a compression spring 44 is interposed between the outer end of the shackle and the boss 43 to hold the piston and diaphragm assembly normally in the fully retracted position shown in FIGURE 6. There is a substantial clearance between the head 42 on the rod and the piston so that fluid pressure operation of the brake does not affect the means for operating it manually.

The levers 38 are pivoted on a main trunnion 45 for angular movement about an axis parallel to the plane of the disc. The trunnion comprises opposed spigots 46 on which the levers pivot projecting from a block which is secured to a lug 47 on the body by bolts 48. As shown more particularly in FIGURE 5 the diameters of the bolts are substantially less than the diameters of bores 49 in the block, through which the bolts pass, and slip washers 51 are located under the heads of the bolts so that the trunnion block can slide to a limited extent in a direction parallel to the plane of the disc.

The inner ends of the levers are pivotally connected by spigots 51a to a single trunnion 52 of the form shown more particularly in FIGURE 8. The trunnion block has a hollow tubular extension 53, and a bore through the trunnion at right angles to the trunnion axis has slidably mounted in it the cylindrical outer end of a spindle 54. The trunnion is slidable in opposed longitudinal slots 55 in a guide tube 56 which is itself slidably guided in a bearing 57 in the outer end of the boss 27 on the body, the central part of the tube being of square cross-section or otherwise formed to limit angular movement. The end of the guide tube 56 nearest the disc is a force fit in a recess in a brake shoe 58 carrying a friction pad 59 for engagement with the adjacent face of the disc.

The friction pad may be a single member or may comprise a number of separate blocks bonded or otherwise secured to a rigid backing plate 61 detachably secured to the shoe in any convenient manner.

The end of the spindle 54 nearest the disc is in screw-threaded engagement with the guide tube 56 and a peg 62 projecting radially from the spindle near its outer end carries a roller 63 working in an inclined slot 64 in a sleeve 65 which is rotatably mounted on the spindle. There is a small clearance between the roller 63 and the slot 64. A bearing collar 66 is mounted on the spindle on the inner side of the sleeve 65 between the sleeve and a circlip or spring ring 67 mounted in an annular groove in the spindle on the outer side of the trunnion.

The outer end of the sleeve is formed with a ring of axially directed angularly spaced teeth 68, and a compression spring 69 located between the collar 66 and a flange 71 on the outer end of the sleeve normally holds the teeth 68 in engagement with complementary teeth on a member 72 rotatably mounted in the outer end of the boss. An external lever handle 73 is fixed in an outwardly projecting part of the member 72.

The brake shoe 58 is supported from the body by a bifurcated suspension link 74 which extends in a generally circumferential direction. One end of the link is pivotally connected to the shoe by a pin 75 and the other end is pivotally connected to the body by a pin 76. The link permits movement of the shoe towards and away from the disc and takes the drag or torque on the shoe when the brake is applied and it also takes any radial thrust on the shoe. As the link is of limited length the pin 75 moves in an arcuate path as the shoe moves towards and away from the disc and the movement of the shoe is accommodated by the clearance provided between the trunnion block and its mounting bolts and by a small amount of canting of the piston of the power actuator.

The body in addition to being mounted on the mounting plate or bracket 22 by the swing arm 16 is also connected to the mounting plate or bracket by a spring arm 78 of C or U outline formed from a spring steel strip. One end of the spring arm is connected to lugs 77 on the body and the other to complementary lugs on the mounting plate or bracket.

The brake is normally applied by admitting compressed air to the diaphragm chamber 29. The diaphragm and piston rock the levers 38 about the trunnion 45 and the levers through the trunnion 52 and the guide tube 56 advance the shoe 58 into engagement with the adjacent face of the disc. The reaction on the body swings the body about the mounting plate or bracket to apply the friction pad 26 to the opposite face of the disc.

As the shoe 58 moves towards the disc it takes the spindle 54 with it and the roller 63 carried by the peg 62 moves along the inclined slot 64 in the sleeve 65 and moves the sleeve angularly. If, owing to wear of the friction surfaces, the angular movement of the sleeve is sufficient to cause the teeth on the sleeve to ride over one or more teeth on the member 72 then as the shoe returns on release of the brake the spindle will be moved angularly relative to the guide tube 56 with which it is in screw-threaded engagement and the effective length of the spindle and guide tube assembly is increased to move the shoe towards the disc by an amount substantially equal to the wear which has taken place.

The clearance between the roller 63 and the slot 64 maintains a small predetermined clearance between the shoes and the disc in the off position of the brake, the spring 44 acting as a return spring.

When new friction pads are fitted the spindle and guide tube assembly can be restored to its original position by rotating the spindle by means of the external handle 73.

When the brake is applied the torque or drag on the body is taken by the mounting plate or bracket through the swing arm which can twist slightly to allow the friction pads to align themselves with the brake disc if there is any angular deflection or canting of the disc. The spring arm can flex to keep the friction pads parallel to the plane of the disc but allows them to take up different angular positions.

The pneumatic actuator used in the embodiment described above can be replaced by an hydraulic actuator.

One important advantage of our improved brake is that it is a completely self-contained unit which can be assembled on the bench by the brake manufacturer and mounted on the vehicle in a single operation.

The vehicle manufacturer only has to provide a single mounting position to take the mounting plate or bracket and does not have to concern himself with mountings or anchorages for an actuator and for brake linkages.

Further, the incorporation of the automatic adjuster in the brake unit itself simplifies construction.

I claim:

1. A disc brake, particularly for rail vehicles, comprising a self-contained unit adapted to be mounted on a vehicle in proximity to a brake disc rotatable with a wheel or axle of the vehicle and comprising a body having an opening adapted to receive a portion of the periphery of the disc, first and second friction members located in the body on opposite sides of said opening for engagement with opposite faces of the disc, said first friction member being mounted in the body for movement towards and away from the disc, actuating means offset from said first friction member, lever means pivotally mounted in the body and operatively connected between said actuator and said first friction member, a mounting bracket adapted to be secured to a part of a vehicle, and a swing arm hingedly connected at one end to the body and at the other end to said mounting bracket, whereby said body is free to move in a direction substantially parallel to the axis of the brake disc.

2. A disc brake as in claim 1 further comprising a spring arm connected between the body and said mounting bracket.

3. A disc brake as in claim 1 further comprising a link extending in a generally circumferential direction, a pivotal connection between one end of said link and said first friction member, and a pivotal connection between the other end of said link and the body, said link taking the drag on said first friction member when the brake is applied.

4. A disc brake as in claim 1 wherein said lever means acts on the first friction member through an assembly incorporating means for automatically adjusting the effective length of the assembly to compensate for wear of the friction members.

5. A disc brake as in claim 4 wherein said assembly comprises a guide tube secured to said first friction member and guided in the body for movement towards and away from the disc, a spindle co-axial with and in screwthreaded engagement with the guide tube, a sleeve rotatably mounted on the spindle, an inclined slot in said sleeve, a peg projecting radially from the spindle and carrying a roller working in said slot, a ring of axially projecting angularly spaced teeth in the end of said sleeve remote from the disc, a complementary ring of teeth on a stationary member and a spring urging said teeth on the sleeve into engagement with the teeth on the stationary member.

6. A disc brake, particularly for rail vehicles, comprising a self-contained unit incorporating a body, a mounting bracket adapted to be secured to a stationary part of a vehicle adjacent to a brake disc rotatable with a wheel or axial of the vehicle, a swing arm hingedly connected at one end to the bracket and at the other end to the body, the axes of said hinged connections being substantially at right angles to the axis of the disc, an opening in the body for receiving a portion of the periphery of the disc, first and second friction members located in the body on opposite sides of said opening for engagement with opposite faces of the disc, said first friction member being mounted in the body for movement towards and away from the disc, and actuating means located in the body for applying said first friction member to the disc, said second friction member being applied to the opposite face of the disc by the reaction of the actuator on the body.

7. A disc brake as claimed in claim 6 wherein said swing arm is constructed and arranged to be capable of a limited degree of resilient twisting, whereby to accommodate canting of the brake disc relative to said mounting bracket.

References Cited
UNITED STATES PATENTS

| | | | |
|---|---|---|---|
| 2,568,858 | 1/1951 | Kovac | 188—72 X |
| 2,781,106 | 2/1957 | Lucien | 188—73 X |
| 3,150,745 | 9/1964 | Eksergian | 188—73 |
| 3,236,336 | 2/1966 | Harrison | 188—73 |

DUANE A. REGER, *Primary Examiner.*